(12) United States Patent
Isenhour et al.

(10) Patent No.: US 9,594,225 B2
(45) Date of Patent: Mar. 14, 2017

(54) METHODS FOR CREATING A DEMARCATION LOCATION IN A STRUCTURE AND ASSOCIATED ASSEMBLIES

(71) Applicant: CORNING OPTICAL COMMUNICATIONS LLC, Hickory, NC (US)

(72) Inventors: Micah Colen Isenhour, Lincolnton, NC (US); Dennis Michael Knecht, Hickory, NC (US); James Phillip Luther, Hickory, NC (US); Reginald Roberts, Taylorsville, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 1 day.

(21) Appl. No.: 14/287,245

(22) Filed: May 27, 2014

(65) Prior Publication Data
US 2014/0270664 A1 Sep. 18, 2014

Related U.S. Application Data

(63) Continuation of application No. PCT/US2012/067181, filed on Nov. 30, 2012.
(Continued)

(51) Int. Cl.
*G02B 6/44* (2006.01)
*G02B 6/00* (2006.01)
(Continued)

(52) U.S. Cl.
CPC .......... *G02B 6/443* (2013.01); *G02B 6/3628* (2013.01); *G02B 6/3887* (2013.01);
(Continued)

(58) Field of Classification Search
CPC ..... G02B 6/443; G02B 6/4476; G02B 6/4486
(Continued)

(56) References Cited

U.S. PATENT DOCUMENTS 5,287,426 A 2/1994 Shahid
5,469,521 A 11/1995 Coutts et al. .......... 385/77
(Continued)

FOREIGN PATENT DOCUMENTS

JP S57186717 A 11/1982

OTHER PUBLICATIONS

Patent Cooperation Treaty International Search Report, Application No. PCT/US2012/067181, Mar. 8, 2013, 3 pages.
(Continued)

*Primary Examiner* — Kaveh C Kianni
*Assistant Examiner* — Hung Lam

(57) ABSTRACT

Disclosed are methods for creating a demarcation of at least one optical fiber in a structure along with a fiber optic cable. The method may include the steps of providing at least one optical fiber having a covering, heating a portion of the covering, and deforming the covering about the at least one optical fiber at a first location to inhibit movement of the at least one optical fiber with respect to the covering. The method may be applied to one or more optical fibers within a covering such as bare loose fibers, ribbonized fibers, buffered fibers or the like.

25 Claims, 4 Drawing Sheets

Related U.S. Application Data

(60) Provisional application No. 61/565,184, filed on Nov. 30, 2011.

(51) Int. Cl.
*G02B 6/36* (2006.01)
*G02B 6/38* (2006.01)

(52) U.S. Cl.
CPC .......... *G02B 6/4479* (2013.01); *G02B 6/3806* (2013.01); *G02B 6/3846* (2013.01); *Y10T 29/49801* (2015.01)

(58) Field of Classification Search
USPC ...... 385/77, 78, 84, 100, 102, 106, 110, 137
See application file for complete search history.

(56) References Cited

U.S. PATENT DOCUMENTS

| | | |
|---|---|---|
| 7,729,584 B2 | 6/2010 | Cody et al. |
| 2002/0096793 A1 | 7/2002 | Marelli et al. ................ 264/1.28 |
| 2004/0141708 A1 | 7/2004 | Yokobiki et al. ............. 385/137 |
| 2013/0012783 A1* | 1/2013 | Vayser et al. ................. 600/249 |
| 2013/0016948 A1* | 1/2013 | Smith et al. .................. 385/100 |

OTHER PUBLICATIONS

CN2012800628753 Search Report Dated Dec. 4, 2015; 2 Pages; Chinese Patent Office.
CN2012800628753 Search Report Dated Sep. 21, 2016; 2 Pages; Chinese Patent Office.

* cited by examiner

METHODS FOR CREATING A DEMARCATION LOCATION IN A STRUCTURE AND ASSOCIATED ASSEMBLIES

PRIORITY APPLICATIONS

This application is a continuation of International Application No. PCT/US12/67181, filed on Nov. 30, 2012, which claims the benefit of priority to U.S. Application No. 61/565,184, filed on Nov. 30, 2011, both applications being incorporated herein by reference.

BACKGROUND

The disclosure is directed to methods for creating a demarcation for at least one optical fiber within a structure and assemblies that include the demarcation. More specifically, the disclosure is directed to method of deforming a covering about the at least one optical fiber at a first location for inhibiting movement of the at least one optical fiber with respect to the covering.

Optical fiber is increasingly being used for a variety of applications, including but not limited to broadband voice, video, and data transmission. Optical networks may use fiber optic cables in variety of outdoor or indoor applications and each have special needs. Typically, the optical fiber is loosely disposed within a structure such as a covering of a fiber optic cable or the like for protecting the optical fiber. Often times the optical fiber is attached to a connector or the like so that connections may between devices as desired. When attaching the optical fiber to a connector it may be desirable to inhibit the optical fiber from moving relative to the inside of the connector so that pulling forces or strain is not transferred to the optical fiber within the connector or other structure; however, the optical fiber should be able to move within the covering along the length of the covering to allowing bending and coiling of the same. However, many of the current methods of inhibiting the optical fiber from moving relative to the covering are time-consuming and/or expensive. Thus, there is an unresolved need for a simple way of quickly and easily inhibiting the optical fiber to move relative to the covering in a desired manner.

SUMMARY

The disclosure is directed to methods for inhibiting movement of the optical fiber relative to the covering along with the structures made according to the methods. The methods provide a demarcation for at least one optical fiber and includes the steps of providing at least one optical fiber having a covering, heating a portion of the covering, and deforming the covering about the at least one optical fiber at a first location to inhibit movement of the at least one optical fiber with respect to the covering. The method may be applied one or more optical fibers within a covering such as bare loose fibers, ribbonized fibers, buffered fibers and the like.

The disclosure is also directed to a method of providing a demarcation for at least one optical fiber including the steps of providing at least one optical fiber and a covering defining an cavity that houses the at least one optical fiber, inserting an adhesive into the cavity of the covering, heating a portion of the covering, and deforming the covering about the at least one optical fiber at a first location to inhibit movement of the at least one optical fiber with respect to the covering.

The disclosure is also directed to a fiber optic cable having at least one optical fiber and a cable jacket. The cable jacket is deformed about the at least one optical fiber to inhibit movement of the at least one optical fiber with respect to the cable jacket. In further embodiments, the optical fiber may be attached to a connector or include an adhesive disposed with the cable jacket at the deformed portion as desired. Additionally, the fiber optic cable can include a positive excess length (EFL) within the fiber optic cable.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the preferred embodiments of the disclosure, examples of which are illustrated in the accompanying drawings. Whenever possible, like reference numbers will be used to refer to like components or parts.

The methods and structures disclosed herein are directed to a demarcation of one or more optical fibers in the structure for inhibit movement of the optical fiber(s) relative to a covering such as a buffer tube, cable jacket or the like that houses the optical fiber(s).

Reference will now be made in detail to the preferred embodiments, examples of which are illustrated in the accompanying drawings. Whenever possible, like reference numbers will be used to refer to like components or parts.

Figure 1A:
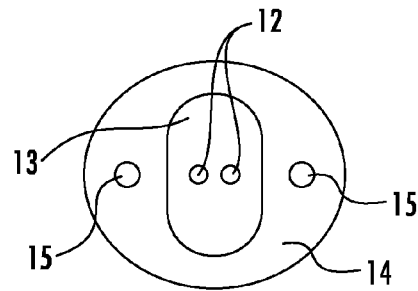
FIG. 1A is a cross-sectional view of the structure of FIG. 1.
Figure 1:
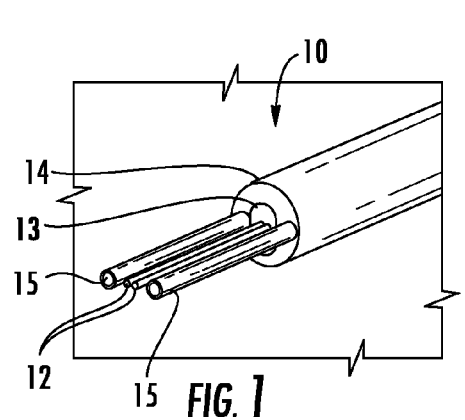
FIG. 1 is a perspective end view of structure having at least one optical fiber disposed within a covering.

FIG. 1 is a perspective view of an end of an explanatory structure 10 having at least one optical fiber 12 disposed within a covering 14 having a longitudinal cavity 13 that surrounds and houses optical fiber(s) 12. As shown, the longitudinal cavity 13 of structure 10 is much larger than the optical fiber 12 housed therein. Specifically, longitudinal cavity 13 has a large slot shape as best shown in FIG. 1a that allows the fibers to migrate within the cavity during aggressive bending and the like. Structure 10 may also include optionally strength members or electrical conductors such as elements 15 that are embedded within a wall (not numbered) of covering 14, but elements 15 may be disposed within the cavity if desired. In this embodiment, covering 14 acts as a cable jacket, but the covering 14 could be a buffer tube, furcation tube, subunit or the like. The methods disclosed herein provide a simple, easy and quick demarcation for one or more optical fibers relative to the structure for inhibiting the movement of the optical fibers. By way of example, the concepts disclosed herein are advantageous for optical assemblies related to consumer electronic applications where ease of manufacture, robustness and economy of the assembly are considerations; however, the concepts may be used for other applications as desired.

Specifically, the concepts disclosed herein provide methods for inhibiting movement of the optical fiber relative to the covering along with the structures made according to the methods. The methods provide a demarcation for at least one optical fiber and includes the steps of providing at least one optical fiber having a covering, heating a portion of the covering, and deforming the covering about the at least one optical fiber at a first location to inhibit movement of the at least one optical fiber with respect to the covering. The method may be applied to one or more optical fibers within a covering such as bare loose fibers, ribbonized fibers, buffered fibers and the like.

Of course, the concepts disclosed herein may be used with other structures where the optical fiber is weakly coupled to the structure and a demarcation is desired. By way of example, structures having coverings about the optical fibers such as buffer tubes, furcation tubes, cable jackets can include one or more cavities for allowing movement of the optical fiber within the cavity. Simply stated, the movement of the optical fiber within the cavity allows the structure to accommodate bending, temperature cycling and like without causing elevated levels of optical attenuation. However, there are instances when it is desirable to inhibit the movement of the optical fiber relative to the structure such as when terminating the structure with an optical connector. Specifically, inhibiting movement of the optical fiber reduces the likelihood of the optical fiber from being strained at the connector which can cause failures and/or degraded optical performance.

Figure 2:
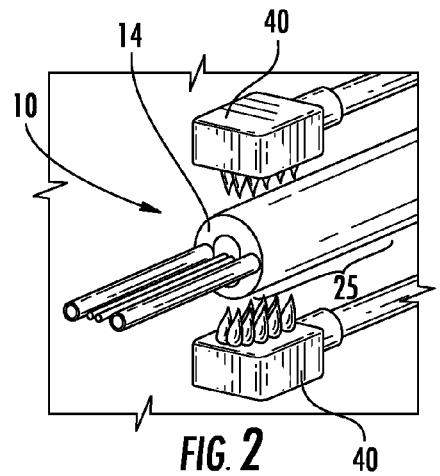
FIG. 2 schematically shows a perspective end view of the covering of FIG. 1 being heated.
Figure 3:
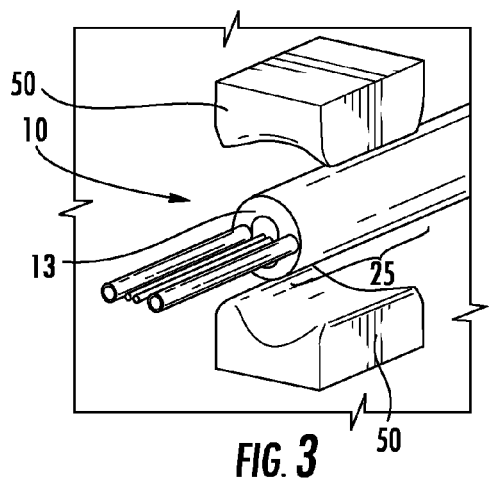
FIG. 3 schematically shows a perspective end view of the covering of FIG. 2 being positioned with respect to a clamping mechanism.
Figure 4:
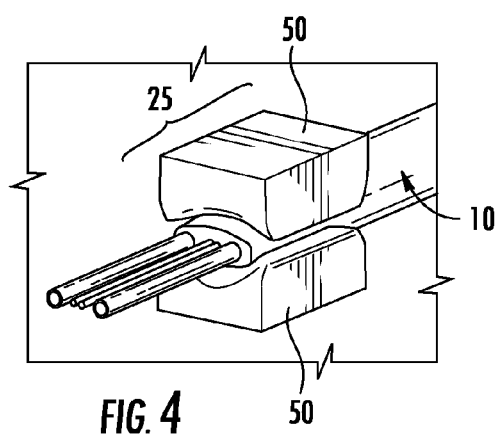
FIG. 4 schematically shows a perspective end view of the covering of FIG. 3 after being deformed using the clamping mechanism of FIG. 3.

FIGS. 2-4 schematically represent the steps for creating a demarcation location on the structure 10 for inhibiting movement of the at least one optical fiber 12 relative to covering 14 at a first location 25. As stated, the concepts disclosed herein can be applied to other structures and structure 10 is merely explanatory. FIG. 2 shows a perspective end view of the first location 25 of structure 10 being heated to soften the material of covering 14 so it can be easily deformed. Heating of covering 14 may occur by any suitable method such as convection heating, conduction heating, radiation heating or combinations of the same. As shown, heating elements 40 are disposed above and below structure 10 for heating the first location 25 of structure 10 to the desired temperature relatively quickly. The desired temperature and dwell time for heating can vary based on the composition of the covering and/or the mass of material being heated.

FIG. 3 schematically shows the first location 25 of structure 10 being positioned with respect to a clamping mechanism 50. By way of example, clamping mechanism 50 can be a movable set of jaws (not numbered) that engage first location 25 of covering 14 for permanently deforming the same. Clamping mechanism 50 provides a suitable deformation force to collapse cavity 13 about the one or more optical fibers 12. Preferably, the deformation of cavity 13 inhibits the relative movement of the optical fiber(s) 12 with respect to covering 14. Clamping mechanism 50 can also provide a predetermined shape and/or surface to the first location 25 as desired. Although FIG. 3 shows cavity 13 arranged with its major axis inline with the clamping direction, the cavity 13 can have other suitable positions as desired such as arranging the major axis of the cavity 13 at an angle to the clamping direction such as perpendicular to the clamping direction. FIG. 4 schematically shows structure 10 after covering 14 is deformed at first location 25 using the clamping mechanism 50. The method may also then be performed at a second location of the structure if desired and/or intermittently along a length of the structure if desired. Although the explanatory example shows the method on an end of the structure 10, the method may also be performed in the middle of a length of the structure. In other variations, the step of heating and the step of deforming the covering are accomplished using the same equipment such as a heated clamping mechanism 50 for streamlining the process.

Figure 9:
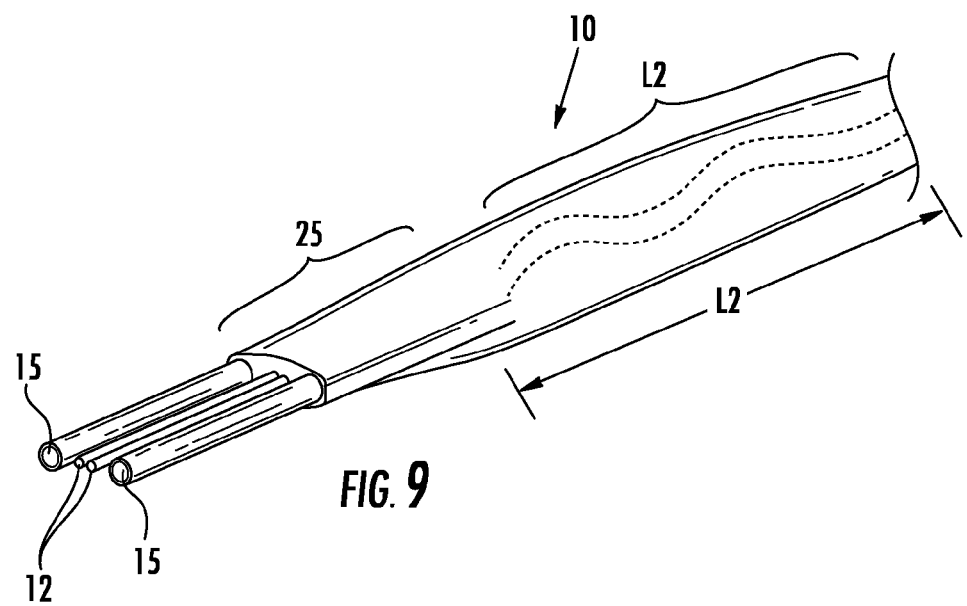
FIG. 9 shows the optical fiber being exposed beyond the deformed portion of the covering in preparation for attaching and a fiber optic connector.

In alternative embodiments, the method may include the step of inserting the optical fiber 12 into the structure before deforming the covering 14. In other words, a length of optical fiber is inserted into a suitable length of the covering and then heated and deformed to collapse the cavity of the covering at one or more locations. Consequently, the length of fiber within the covering 14 may be controlled before deforming the same. Preferably, the finished structure with the demarcation has an optical fiber over-length (i.e., an excess fiber length) when compared with the covering. Most structures 10 are manufactured in long lengths on a continuous extrusion line and the optical fiber over-length or positive excess fiber length (EFL) is predetermined and/or controlled in manufacturing. Specifically, structures housing optical fibers are manufactured with an optical fiber length L1 within the covering that is slightly longer than a length of the covering L2 (i.e., L1>L2) so that any strain imparted to the structure is not immediately transferred to the optical fiber therein to preserve optical performance during use in the field. In other words, the length L1 of the optical fiber 12 within the length L2 of the covering 14 undulates within the covering 14 such as shown in FIG. 9 since it is longer. However, structure designs where the optical fiber is weakly coupled to the covering (i.e., a relatively large cavity) can allow the optical fiber to migrate and/or be removed from a portion of the structure during reeling, coiling, etc. The method disclosed herein can further include the step of maintaining a positive excess fiber length (EFL) when deforming the covering of the structure regardless of the method of construction.

Typically, the amount of positive EFL is relatively small such as 1% or less relative to the covering length since too much positive EFL can also cause optical attenuation issues. By way of explanation, if an optical fiber had a positive EFL of +0.1% the structure would theoretically need to strain by the corresponding percentage (e.g., +0.1%) before any of the strain forces were imparted onto the fiber, thereby avoiding optical performance issues due to strain on the optical fiber. As a numerical example, if the covering has a length of 100 centimeters and the positive EFL is 1.0%, the optical fiber would have a length of 101 centimeters within the 100 centimeters of covering. However, it is relatively easy for the optical fiber to migrate within a structure where the optical fiber is not strongly coupled to the same. The concepts disclosed herein allow the creation of positive EFL in the structure such as when creating short segments (i.e., short lengths) of the structure from a bulk structure disposed on the reel as discussed in further detail herein.

Figure 5:
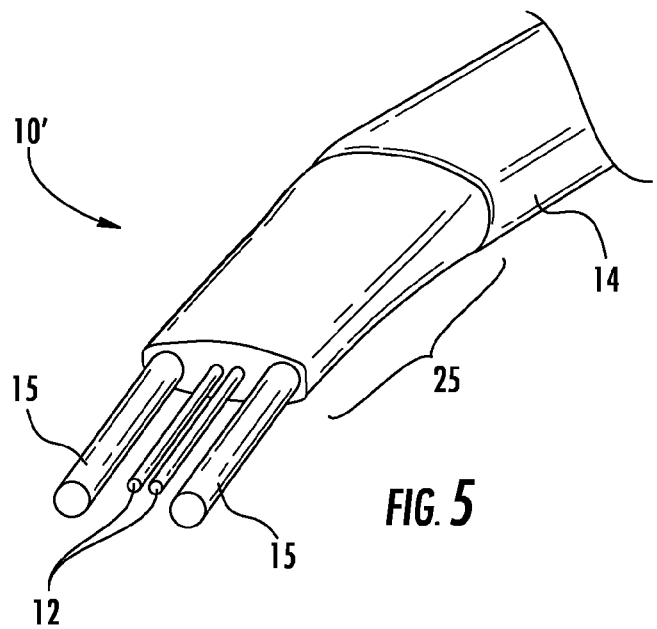
FIG. 5 schematically depicts a structure that was deformed about a strength member or electrical conductor.

Other variations of the methods are also possible using the disclosed concepts. For instance, the step of deforming the covering may include deforming the covering about at least one strength member or at least one electrical conductor of the structure. By way of example, FIG. 5 schematically depicts a structure 10' similar to structure 10 having a covering 14 that was deformed about a member 15 that represents a strength member or electrical conductor of structure 10'. The concepts disclosed herein can be performed on other suitable structures and/or include other optional steps as desired.

Figure 6:
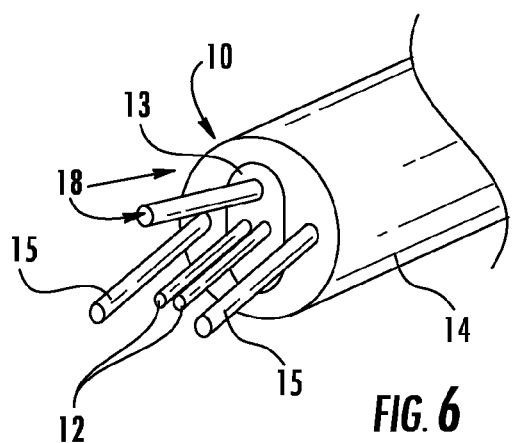
FIG. 6 schematically depicts a step for an alternative method for creating a structure with a demarcation location.

Still other variations of the methods are possible for creating structures with one or more demarcation locations. Simply stated, FIG. 6 shows an alternative method that includes the further step of inserting an adhesive 18 into the covering 14 of structure 10 before deforming the same as discussed herein as represented by the arrow. The adhesive 18 can be any suitable material such as a portion of a glue stick or the like and may be placed within the cavity either hot (i.e., flowable or softened) or at ambient temperature as desired. As shown, a piece of an adhesive 18 is being inserted into a portion of cavity 13 so it can be deformed within cavity 13 along with covering 14 to aid with inhibiting movement of optical fibers 12 relative to covering 14 since it may use a material that is different than the covering 14. One or more portions of adhesive 18 may be inserted into cavity 13 and/or the adhesive can be wrapped about the optical fibers/cavity as desired. The insertion of adhesive 18 into the cavity 13 can also help size and/or shape the first location having the deformed portion so it does not have too small of a profile compared with the portion of the covering 14 that is not deformed. In other words, the deformed portion has a similar size and/or shape compared with the non-deformed portion of the structure.

Figure 7:
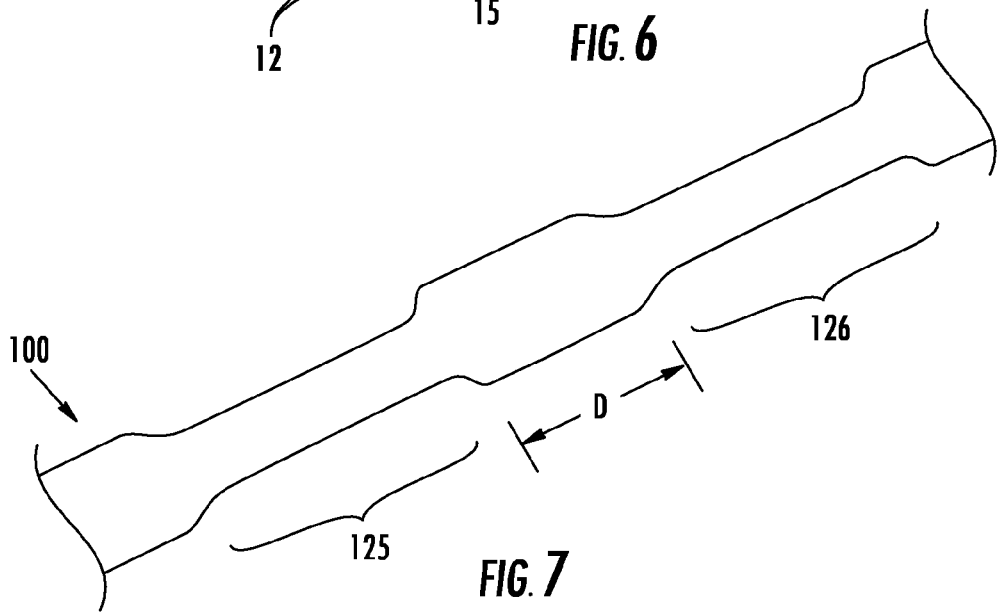
FIG. 7 schematically depicts another structure that was heated and deformed at a first location and a second location.
Figure 8:
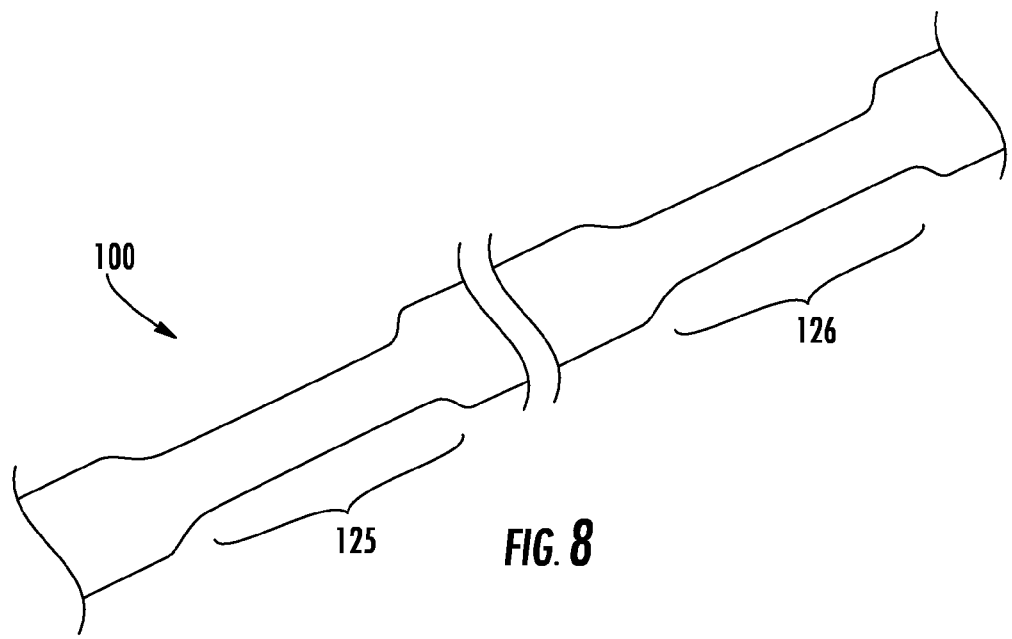
FIG. 8 shows the structure of FIG. 7 being cut between the first location and the second location.

Other methods disclosed may include the step of deforming a second location of the covering and cutting the at least one optical fiber between the first location and the second location for forming two segments. Illustratively, FIG. 7 schematically depicts a structure 100 that was heated and deformed at a first location 125 and at a second location 126. In further embodiments, a distance D between the first location 125 and the second location 126 is specified to allow a desired length of optical fiber for termination. By way of example, the distance D is 50 millimeters or greater, but other suitable distances are possible. FIG. 8 shows the structure 100 after being cut between the first location 125 and the second location 126 for creating two segments. For instance, the method represented by FIGS. 8 and 9 is suitable when paying off a bulk structure from a reel and creating a plurality of segments from the bulk structure.

Further, the methods disclosed herein can maintain the native positive EFL in the structure as manufactured and delivered on a reel. Simply stated, the native positive EFL may be preserved within the structure as it is removed from the reel before it can migrate or be disturbed along the length of the structure. For instance, an initial length may be paid-off a reel to expose an undisturbed section of the structure and then the desired locations can be deformed along the length of the structure for locking the optical fiber(s) in position for a desired segment length. By way of example, the spacing between adjacent demarcation locations can be metered out to desired length such as 1 meter or other desired distance before cutting and preparing the segments for connectorization. Preferably, the deforming is performed before cutting in to the desired segment length, but cutting may occur first and deforming the covering may follow if desired.

Figure 10:
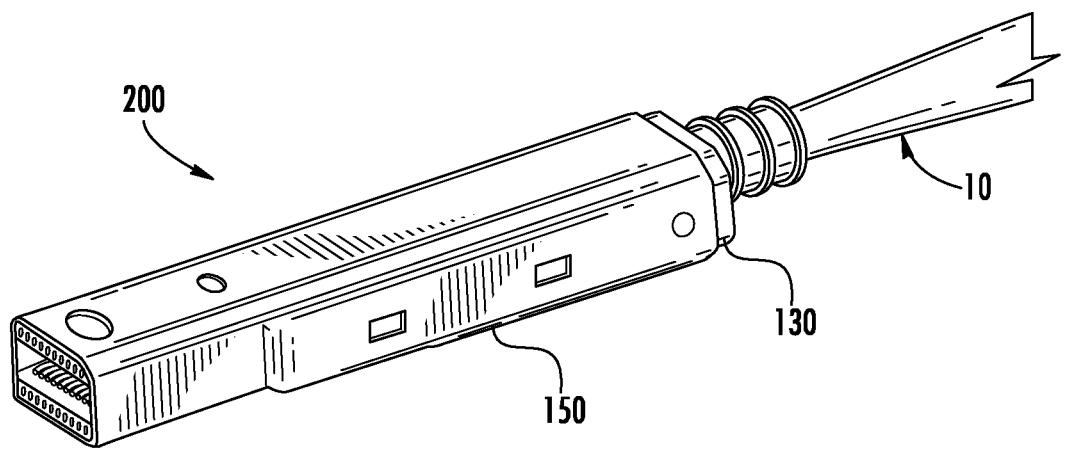
FIG. 10 depicts the structure of FIG. 9 with a fiber optic connector attached to the optical fiber.

FIG. 9 shows the optical fiber being exposed beyond the deformed portion of the covering in preparation for attaching and a fiber optic connector. FIG. 9 also schematically depicts a positive EFL for optical fibers 12 within the covering 14 as represented by the undulating fiber having length L1 within a covering having length L2. The step of deforming the covering at the first location may collapse the covering into a predetermined shape such as round, flat, oval, rectangular, polygon, ribbed, or other suitable shape as desired for the application. By way of example, certain shapes may be desired for attaching the structure to the end of the connector or the like. In still further embodiments, the deformed covering may be formed with a shape that helps secure the structure to a portion of the connector. Moreover, the FIG. 10 depicts the structure of FIG. 9 with a fiber optic connector 150 attached to the optical fiber to form assembly 200. The method of includes the further step of attaching a fiber optic connector to the at least one optical fiber and includes the step of placing a portion of the deformed covering into a housing 130 of connector 150. By way of example, the deformed portion may include squared off portions or wings that are trapped between an upper and lower shell of the connector to provide structure (i.e., cable) strain relief.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A method of providing a demarcation for at least one optical fiber, comprising the steps of:
    providing at least one optical fiber having a covering;
    heating one or more portions of the covering;
    deforming the one or more portions of the covering about the at least one optical fiber at a first location to inhibit movement of the at least one optical fiber with respect to the covering; and
    deforming the one or more portions of the covering at a second location and cutting the at least one optical fiber between the first location and the second location for forming two segments.

2. The method of claim 1, further including the step of maintaining a positive excess fiber length (EFL) when deforming the covering.

3. The method of claim 1, wherein a distance between the first location and the second location is 50 millimeters or greater.

4. The method of claim 1, the step of deforming the covering including deforming the covering about at least one strength member or at least one electrical conductor.

5. The method of claim 1, further including the step of inserting an adhesive into the covering.

6. The method of claim 1, the step of deforming the covering being accomplished using a clamping mechanism.

7. The method of claim 1, wherein the step of heating and the step of deforming the covering are accomplished using the same equipment.

8. The method of claim 1, wherein the step of deforming the covering collapses the covering into a predetermined shape.

9. The method of claim 1, further including the step of attaching a fiber optic connector to the at least one optical fiber.

10. The method of claim 1, further including the step of placing a portion of the deformed covering into a housing.

11. A structure according to the method of claim 1.

12. A method of providing a demarcation for at least one optical fiber, comprising the steps of:
    providing at least one optical fiber and a covering defining an cavity that houses the at least one optical fiber;
    inserting an adhesive into the cavity of the covering;
    heating one or more portions of the covering;
    deforming the one or more portions of the covering about the at least one optical fiber at a first location to inhibit movement of the at least one optical fiber with respect to the covering; and
    deforming the one or more portions of the covering at a second location and cutting the at least one optical fiber between the first location and the second location for forming two segments.

13. The method of claim 12, further including the step of maintaining a positive excess fiber length (EFL) when deforming the covering.

14. The method of claim 12, wherein a distance between the first location and the second location is 50 millimeters or greater.

15. The method of claim 12, wherein the adhesive has a lower melting temperature than a melting temperature of the covering.

16. The method of claim 12, the step of deforming the covering including deforming the covering about at least one strength member or at least one electrical conductor.

17. The method of claim 12, the step of deforming the covering being accomplished using a clamping mechanism.

18. The method of claim 12, wherein the step of heating and the step of deforming the covering are accomplished using the same equipment.

19. The method of claim 12, wherein the step of deforming the covering collapses the covering into a predetermined shape.

20. The method of claim 12, further including the step of attaching a fiber optic connector to the at least one optical fiber.

21. A structure according to the method of claim 20.

22. A fiber optic cable comprising at least one optical fiber and a cable jacket, wherein the cable jacket is deformed about the at least one optical fiber at a first location and a second location to inhibit movement of the at least one optical fiber with respect to the cable jacket, wherein the at least one optical fiber is cut between the first location and the second location to form two segments.

23. The fiber optic cable of claim 22, the at least one optical fiber being attached to a connector.

24. The fiber optic cable of claim 22, further including an adhesive disposed within the cable jacket at the deformed portion.

25. The fiber optic cable of claim 22, further including a positive excess fiber length (EFL) within the fiber optic cable.

* * * * *